United States Patent [19]

Beasley

[11] Patent Number: 5,321,736
[45] Date of Patent: Jun. 14, 1994

[54] DISTRIBUTED RF REPEATER ARRANGEMENT FOR CORDLESS TELEPHONES

[75] Inventor: Andrew S. Beasley, Lake Errock, Canada

[73] Assignee: PCS Microcell International Inc., Burnaby, Canada

[21] Appl. No.: 924,906

[22] Filed: Oct. 30, 1992

[30] Foreign Application Priority Data

Jan. 3, 1992 [CA] Canada ................................. 2058736

[51] Int. Cl.⁵ ...................... H04M 11/00; H04B 1/60; H04B 7/185; H04B 3/36
[52] U.S. Cl. ......................................... 379/58; 379/61; 455/11.1; 455/13.1; 455/14; 455/15
[58] Field of Search .............................. 379/58, 59, 61; 455/11.1, 13.1, 14, 15, 23; 359/121

[56] References Cited

U.S. PATENT DOCUMENTS 4,322,854 3/1982 Bundens et al. ...................... 455/4.1
4,408,353 10/1983 Bowen et al. ......................... 359/121
4,688,260 8/1987 Shutterly et al. ..................... 359/121
5,010,583 4/1991 Perken .................................. 455/15
5,058,199 10/1991 Grube ................................... 455/15
5,163,158 11/1992 Tendler et al. ..................... 455/11.1

*Primary Examiner*—Stephen Chin
*Assistant Examiner*—Vijay Shankar
*Attorney, Agent, or Firm*—Brian M. Long

[57] ABSTRACT

An RF repeater arrangement for use in linking cordless handsets to a base station, has RF repeaters spaced from a common power supply unit and so distributed over an area to be serviced by the power supply unit that each of the RF repeaters is spaced from at least one other of the RF repeaters by a distance which is less than the range of coverage of the handsets. The power supply unit has a DC power supply connected to supply DC power to said a cable inner conductor, and RF repeaters each have an antenna for exchanging the radio signals with the handsets, transmit and receive circuits and a DC power pick-up connected to the co-axial cable inner conductor for powering the respective RF repeater.

4 Claims, 10 Drawing Sheets

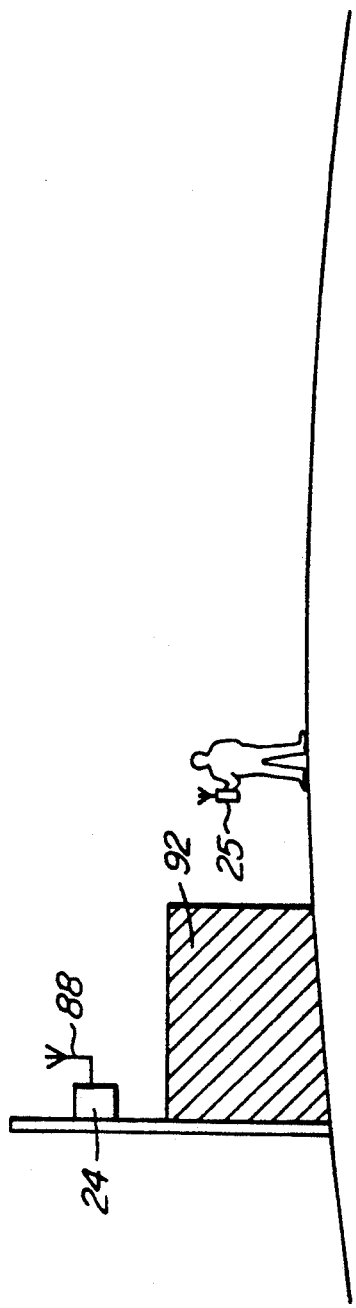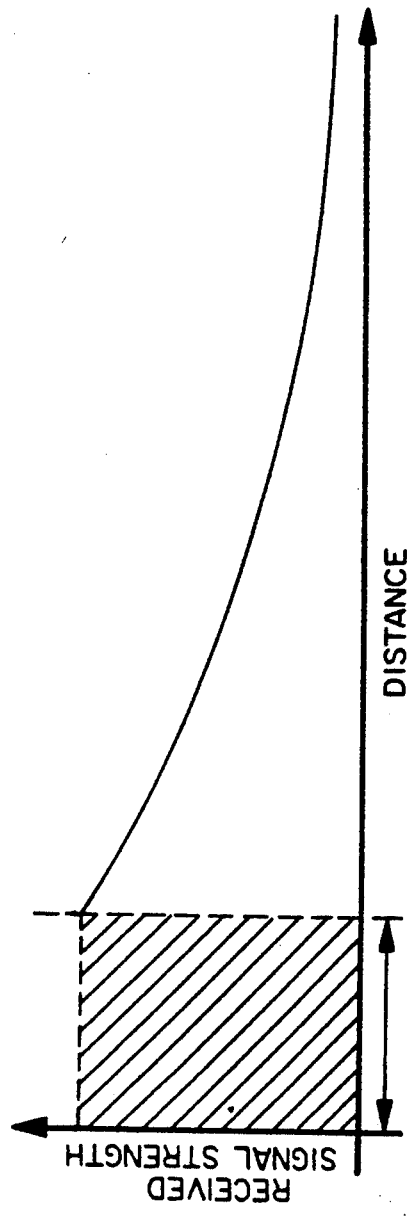

DISTRIBUTED RF REPEATER ARRANGEMENT FOR CORDLESS TELEPHONES

BACKGROUND OF THE INVENTION

1. Field of the Invention

The present invention relates to RF repeater arrangements for use in linking cordless handsets to base stations in cordless telephone systems and to methods of providing such arrangements.

2. Description of the Related Art

Base stations are employed in cordless telephone systems for transferring telephone signals from a public switched network to cordless handsets. However, it is a substantial disadvantage of conventional systems that their base stations have only a very limited coverage range. The coverage range is important in determining the viability of some systems, since it determines how many potential subscribers to the service can be reached.

BRIEF SUMMARY OF THE INVENTION

According to the present invention, there is provided an RF repeater arrangement for use in linking cordless handsets to a base station in a cordless telephone system, the arrangement comprising a power supply unit for interfacing with the base station, a plurality of RF repeaters for interfacing with the cordless handsets, the second RF repeater parts each having transmit circuit means for transmitting signals from the first RF repeater part as off-air signals to the handsets and receive circuit means for receiving off-air signals from the handsets and feeding the thus-received signals through the signal conduit to the base station and the second RF repeater parts. The signal conduit comprises coaxial cable incorporating an inner conductor serving as a power conductor. The power supply unit includes a DC power supply connected to transmit DC power through the coaxial cable inner conductor to the RF repeaters for powering the latter.

A preferred embodiment of the invention includes an RF repeater arrangement further comprising means at the power supply unit for supplying transmit/receive timing pulses through the coaxial cable to the RF repeaters; and means at each of the RF repeaters parts for controlling the supply of the power to the transmit circuit means and the receive circuit means in accordance with the transmit/receive timing pulses. Preferably, the means for supplying transmit/receive timing pulses comprise means for modulating the pulses onto the coaxial cable inner conductor.

BRIEF DESCRIPTION OF THE DRAWINGS

The present invention will become more readily apparent to those skilled in the art from the following description of embodiments of the invention when taken in conjunction with the accompanying drawings, in which:

FIGS. 9A and 9B illustrate another wall mounted antenna arrangement.

THE PREFERRED EMBODIMENTS

Figure 1:
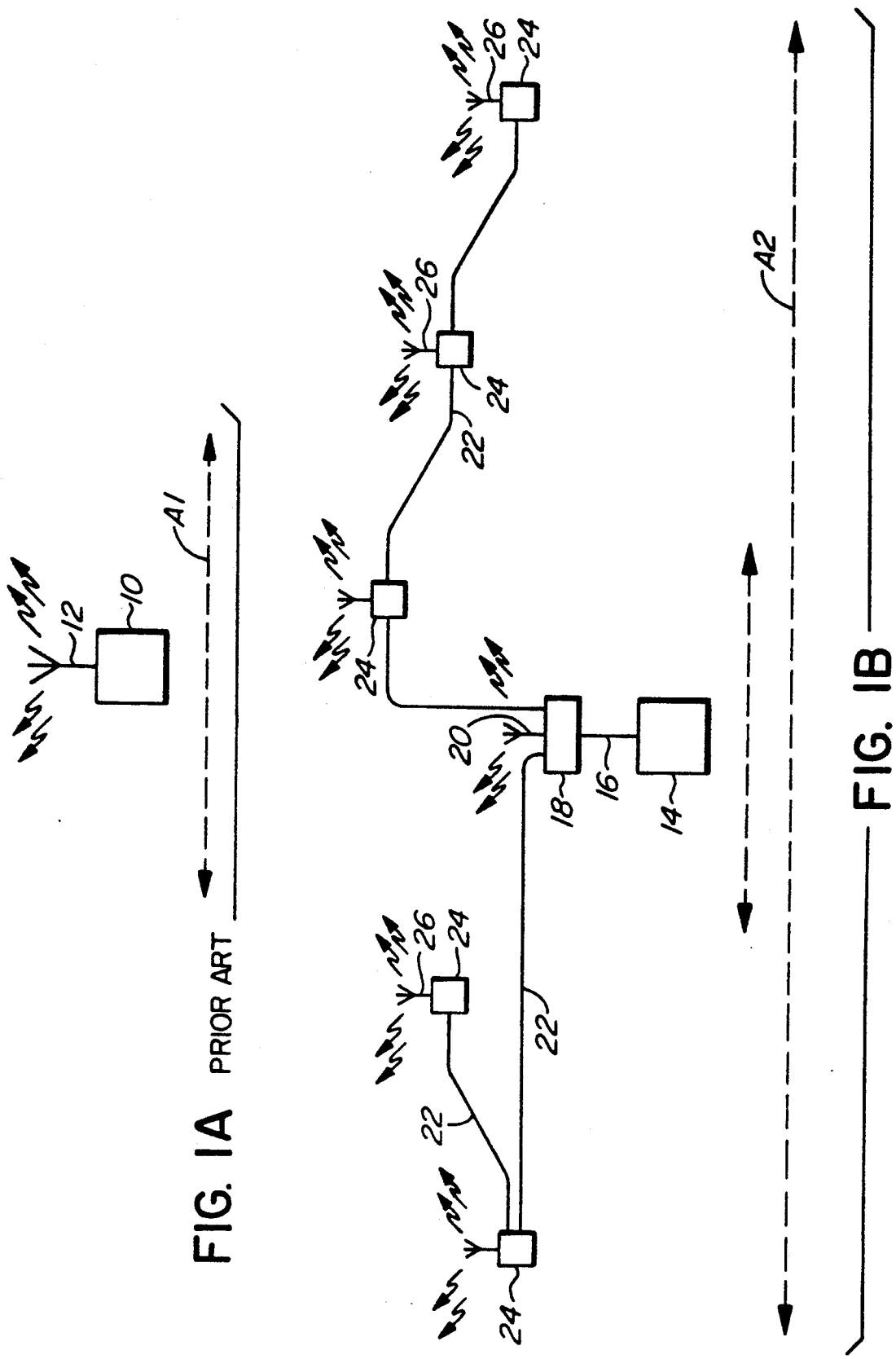
FIG. 1A shows a prior art base station.
FIG. 1B shows a distributed RF repeater arrangement.

As shown in FIG. 1A of the accompanying drawings, a base station 10 provided with an antenna 12 for exchanging off-air signals with a cordless handset (not shown) has only a very limited coverage area, which has a diameter indicated by the double-headed arrow A1.

FIG. 1B diagrammatically illustrates a base station provided with an RF repeater arrangement according to the present invention.

As shown in FIG. 1B, a base station 14 is connected by a coaxial cable 16 to a central power supply unit 18 of an RF repeater arrangement. The power supply unit 18 serves to interface with the base station 14 and is provided with an antenna 20 for exchanging off-air signals with handsets (not shown).

The power supply unit 18 is also connected by coaxial cable 22 to five RF repeaters 24, which are each provided with an antenna 26 for exchanging off-air signals with the handsets. It is, however, pointed out that the number of second RF repeaters may be greater than or less than five.

The RF repeaters 24 form a distributed RF repeater arrangement which has a coverage area having a width indicated by the double-headed arrow A2 and, as will be apparent from FIG. 1B, the coverage area of the RF repeaters 24 is substantially greater than that of the single antenna 12 of the base station 10 of FIG. 1A. In this way the cost of the single base station 14 can be amortized over a substantially greater net coverage area. This may be of particular advantage, for example, in the case of a multi-story car park, in which the RF repeaters 24 are located e.g. on respective stories and connected to the base station 14, which is located at the exit/entrance level of the car park.

Another circumstance where the arrangement of FIG. 1B is advantageous is in the case where transmission levels of such equipment are limited by legal regulations.

Figure 2:
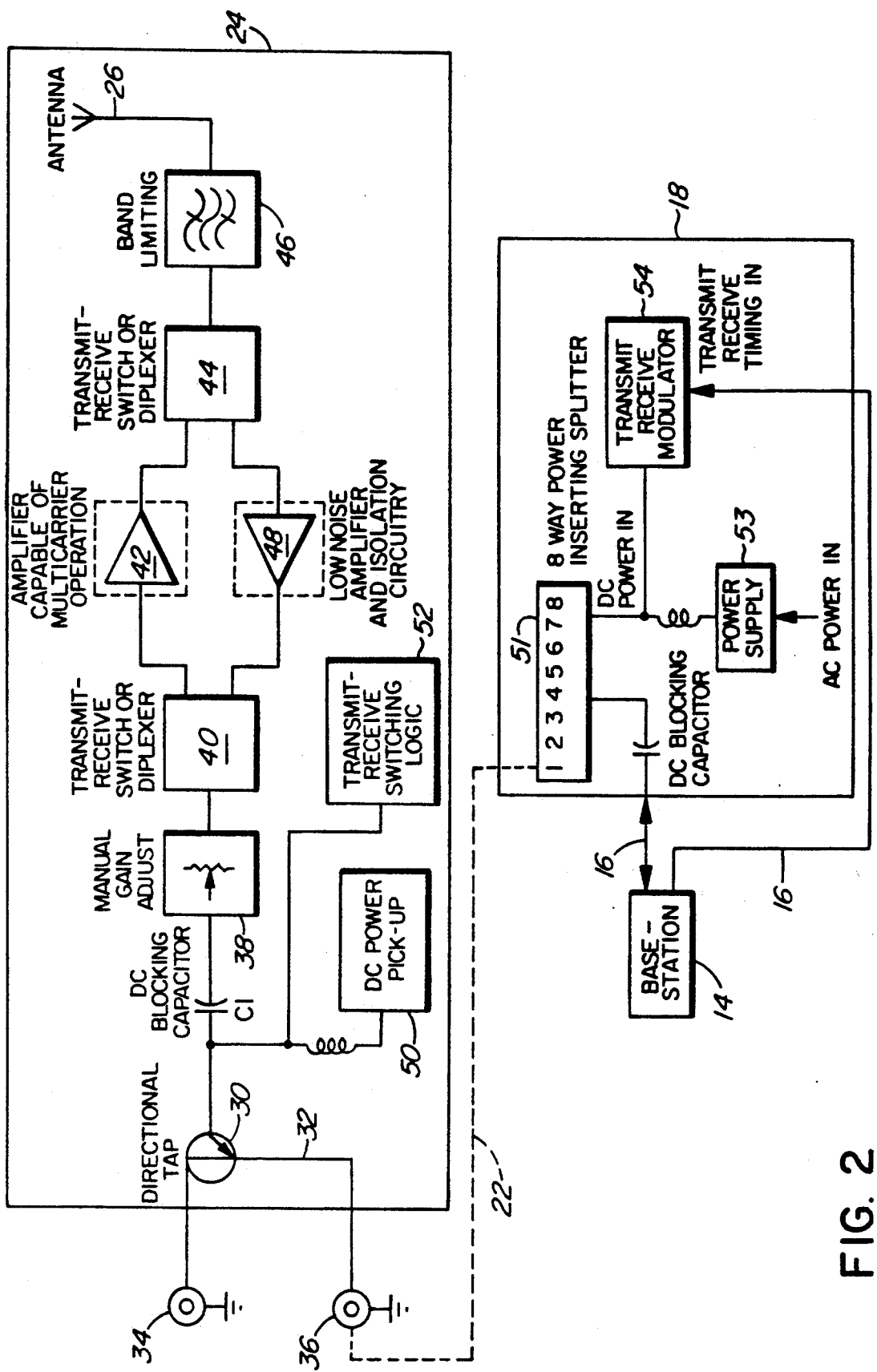
FIG. 2 shows components of the RF repeater arrangement of FIG. 1B according to an embodiment of the present invention.

As shown in FIG. 2, which shows the base station 14 and components of the power supply unit 18 and of one of the RF repeaters 24, the latter has a directional tap 30 on a coaxial loop 32 extending between an output 34 and an input 36 connected to the coaxial cable 22.

The directional tap 30 is connected through a DC blocking capacitor C1 and a manual gain adjust 38 to a transmit/receive switch or diplexer 40.

Outgoing signals from the transmit/receive switch or diplexer 40 are amplified by an amplifier 42 which is capable of multicarrier operation and then pass through a further transmit/receive switch or diplexer 44 and a bandpass filter 46 to the antenna 26.

Received off-air signals between the transmit/receive switches or diplexers 40 and 44 pass through a low noise amplifier 48.

The cable 22 from the first RF repeater part 18, in addition to transporting the incoming and outgoing telephony signals, also carries DC power, which is supplied to a power pick-up 50 for powering the second RF repeater part 24, and transmit/receive timing signals which are received in a transmit-receive switching logic unit 52.

The transmit/receive timing signals, which are supplied from the base station 14, are modulated onto the centre of the coaxial cable 22 as DC pulses by a modulator 54.

The first RF repeater part 18 also has an 8-way power inserting splitter 51 for providing power to the second parts 24 and a power supply and booster unit 53 for providing DC power to the splitter 51.

Figure 3:
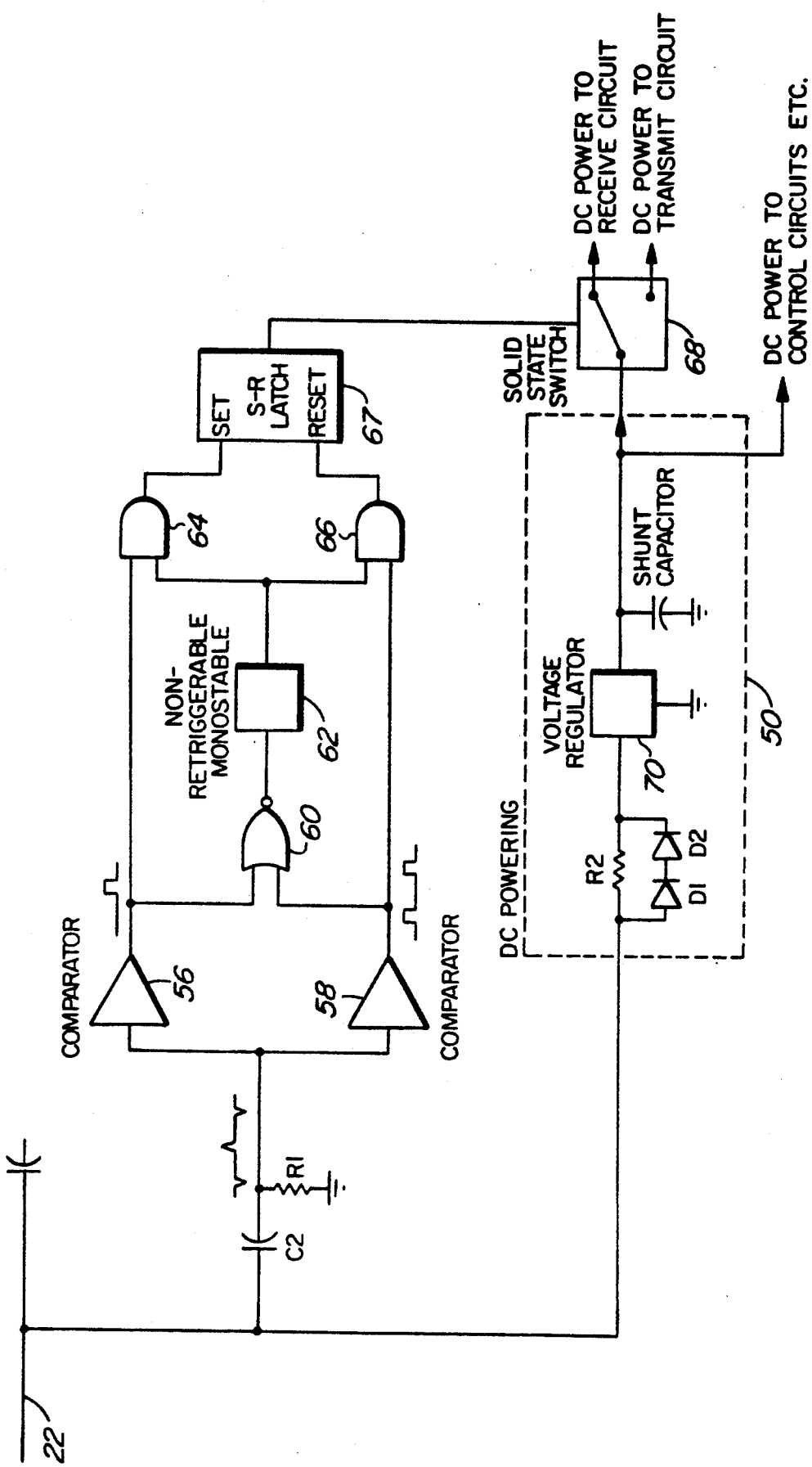
FIG. 3 shows a circuit diagram of a part of the apparatus of FIG. 1.
Figure 3A:
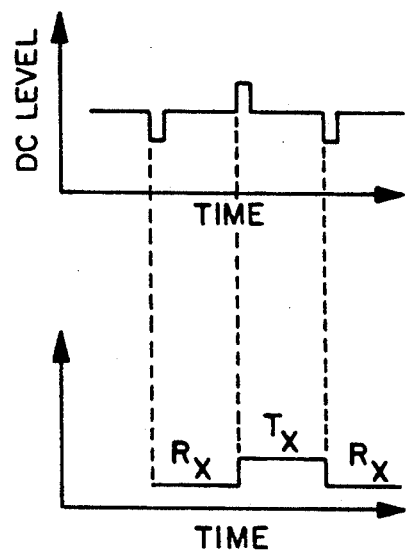
FIGS. 3A and 3B show waveforms which occur in the circuit of FIG. 3.

FIG. 3 illustrates the components of the transmit-receive switching logic unit 52, which has an AC coupling capacitor C2 for coupling a change in the DC level of the transmit/receive pulses to two comparators 56 and 58.

The comparators 56 and 58 are given a low impedance input through a resistor R1 to ground to sharpen the leading edges of the pulses, and detect positive and negative pulses, respectively.

Figure 3B:
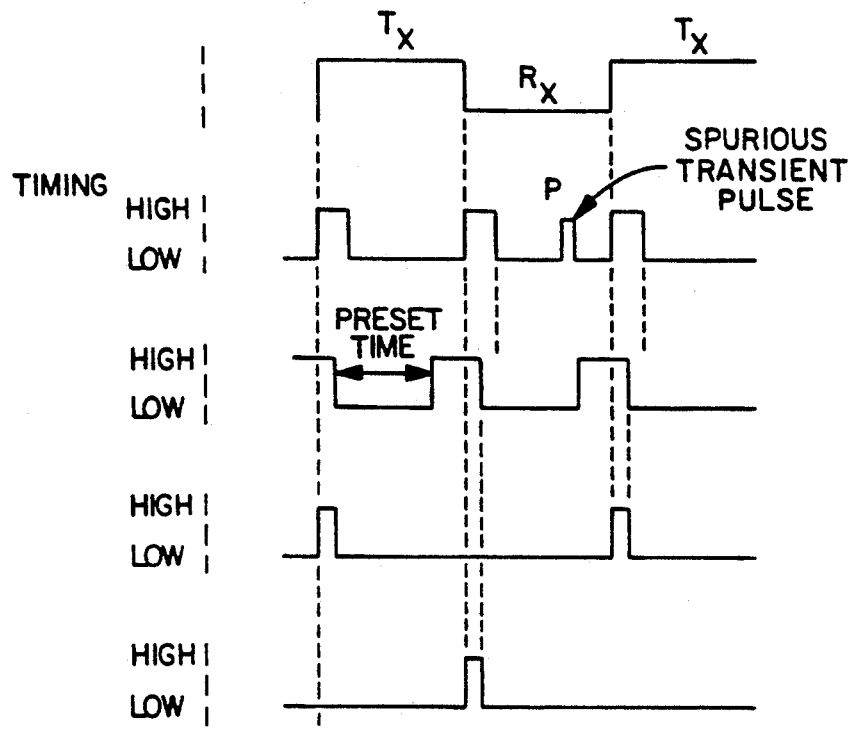

The outputs of the comparators 56 and 58, through an OR gate 60, cause a non-retriggerable monostable 62 to fire, so that for a preset time (see waveform B in FIG. 3B) after pulse detection, no further change of the transmit/receive state is possible. Thus, the effect of power supply transients caused by transmit-receive switching is counteracted. Spurious pulses such as pulse P shown in FIG. 3B at waveform A are ignored because of this monostable gating.

AND gates 64 and 66 have inputs connected to the output of the monostable 62 and to the comparators 56 and 58, and output connected to an S-R latch 67, which provides the transmit-receive waveform to operate a solid state switch 68, which effects switching of the DC power to the receiver circuit and the transmit circuit of the second RF repeater part 24.

FIG. 3 also shows the components of the DC power pick-up unit 50, which include a conventional voltage regulator circuit 70 for accessing the power supplied through the centre of the coaxial cable 22 through diodes D1 and D2 and a resistor R2, which ensure that the DC power can rise and fall quickly, i.e. pass positive and negative pulses, by buffering the shunt capacitance from the center of the coaxial cable 22. The resistor R2 acts as a buffer and the diodes D1 and D2 ensure that the resistor R2 does not consume power between pulses. Switching transients, caused by large changes in demand between the transmit and receive states, are damped out by the resistor R2 and the diodes D1 and D2, i.e. there are no transients present outside the "immunity" time period provided by the monostable.

Figure 4:
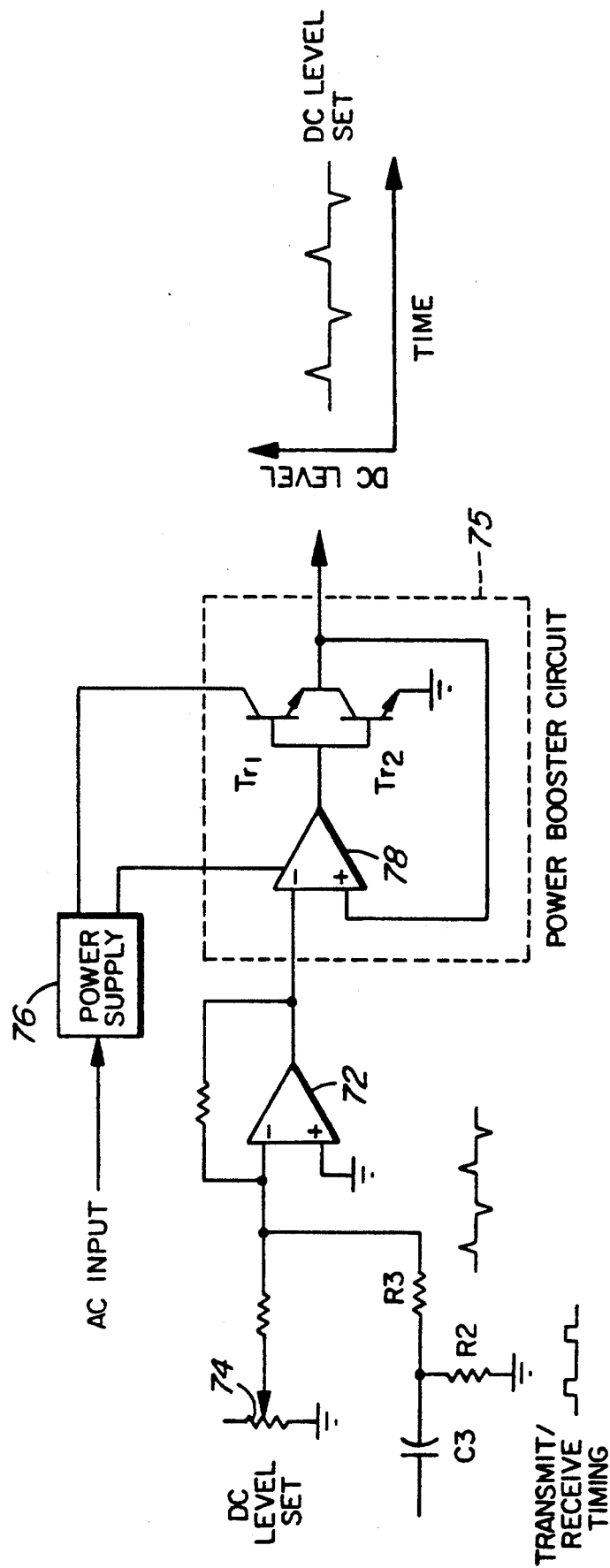
FIG. 4 shows a circuit diagram of a further part of the apparatus of FIG. 2.

FIG. 4 shows the components of the power supply and booster unit 53 and the transmit/receive modulator 54. A combination of a capacitor C3 and a resistors R2 and R3 provide pulses to an operational amplifier 72, which is configured to sum the pulses with a DC level set by a variable resistor 74.

The output from the operational amplifier 72 is supplied to a power booster circuit 74 which, with a power supply 76, forms the power supply and booster unit 53. The power booster circuit 74 has an amplifier 78 controlling a pair of transistors Tr1 and Tr2 and supplies the current required for operating the above-described handset interface parts of the RF repeater part 24.

It is pointed out that the above-described apparatus does not require heterodyne operation.

The operation of the system can be further improved by careful location of the RF repeaters 24 so as to reduce the number of call hand-off required as the user of a handset roams around from the coverage area of one antenna to those of other antennas.

Figure 5:
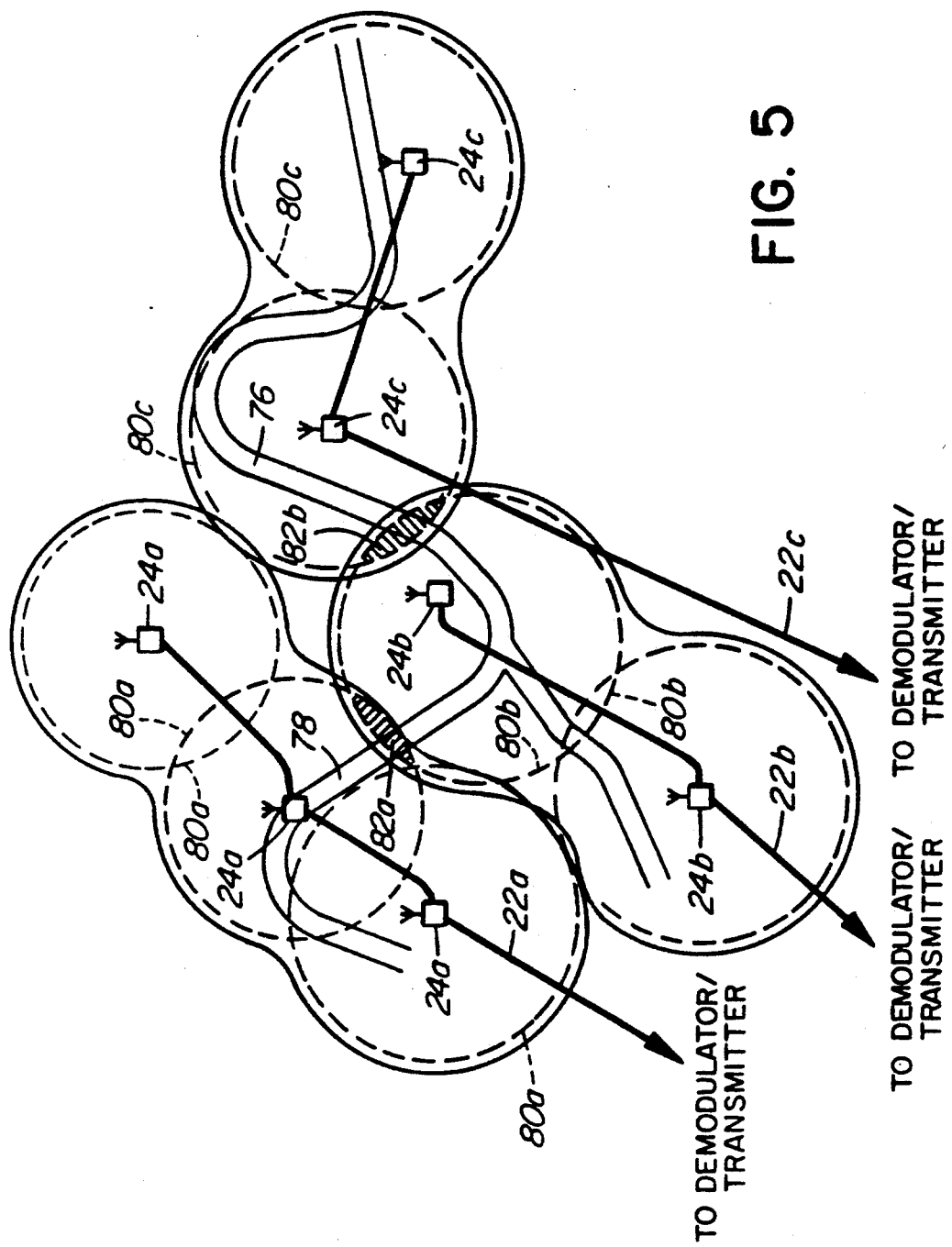
FIG. 5 shows a diagrammatic plan view of three groups of RF repeaters connected by three different cables.

Thus, considering the RF repeater arrangements illustrated in FIG. 5 for covering a traffic path 76 with a branch path 78, three coaxial cables 22a, 22b and 22c are shown connecting respective groups of RF repeaters 24a, 24c and 24d.

The coverage areas of the repeaters 24a, indicated by reference numerals 80a, overlap one another, so that a handset user can roam from one to the other of these areas 80a without requiring call hand-off. Likewise, the RF repeaters 24b have overlapping antenna coverage areas 80b requiring no call hand-offs and the RF repeater parts 24c have antenna coverage areas 80c which require no call hand-offs.

However, when the handset user moves from the coverage areas 80a to the coverage areas 80b, or from the latter to the coverage areas 80c, through the transition zones 82a and 82b shown by shaded lines, call hand-offs are required.

Figure 6:
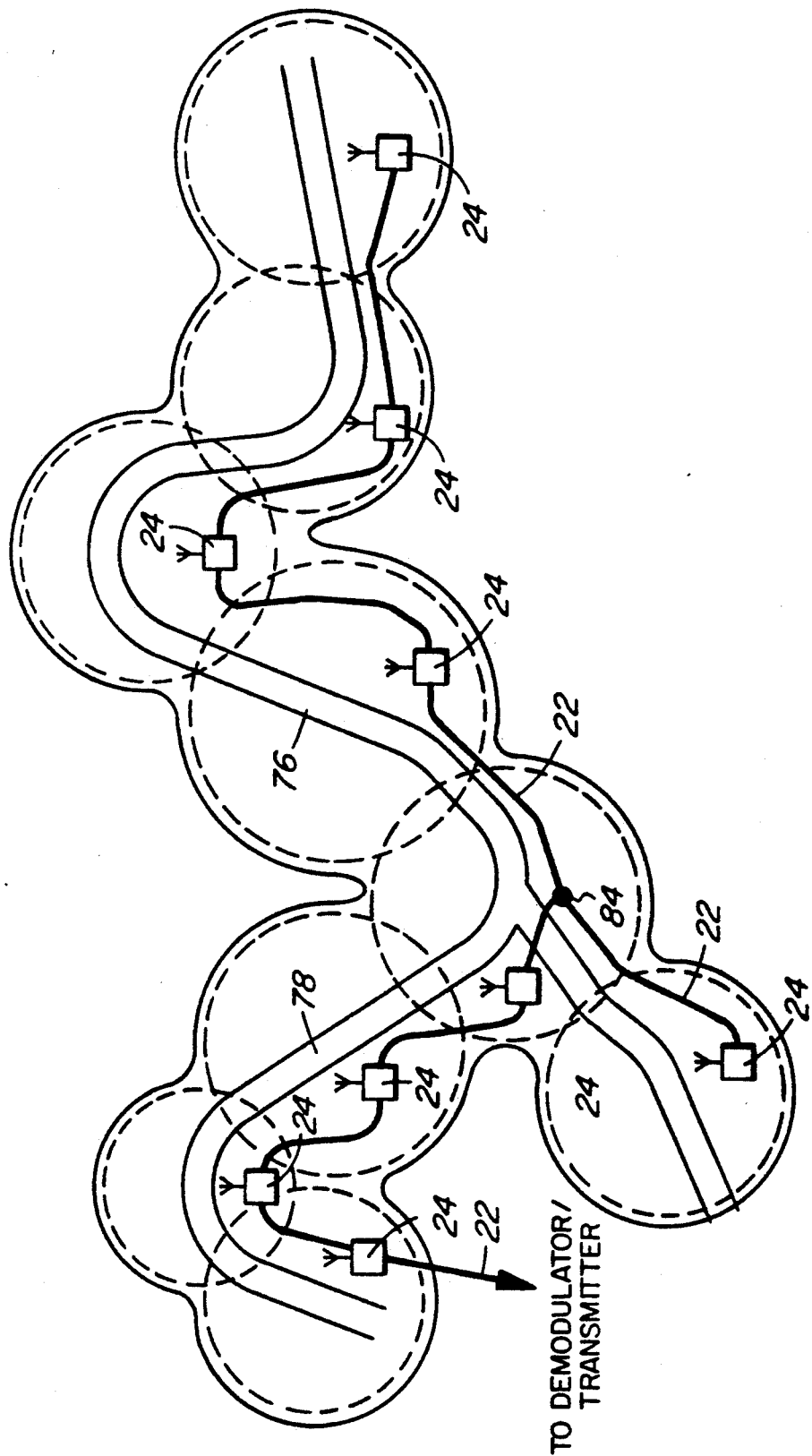
FIG. 6 shows a distributed antenna arrangement.

With a view to reducing the number of call hand-offs which are required, it is now proposed to improve the layout of the RF repeater arrangement in a manner which will now be described with reference to FIG. 6, which shows the same traffic path 76 and branch 78 as FIG. 5. In the case of FIG. 6, however, the RF repeaters 24 are arranged so that their antenna coverage areas 80 are located in sequence along the length of the traffic path 76 and the branch 78, and overlap one another along this path and branch, with the RF repeaters 24 all connected through a common coaxial cable 22 to a power supply unit (not shown) which is common to all of the RF repeaters 24. A splitter 84 is provided at a branch in the coaxial cable 22 where the traffic path 76 meets the branch 78.

With this arrangement, no call hand-off is required when a handset user roams from one antenna coverage area 80 to another.

In producing an RF repeater layout such as that illustrated in FIG. 6, it is firstly necessary to effect a survey of the area to be covered in order to determine traffic flow patterns, which may for example be pedestrians travelling along streets and through entrances and exists from shopping malls, etc.

When this survey has been completed, so that the traffic patterns, such as those represented by the traffic path 76b and its branch 78, are known, the optimum distribution of the RF repeater parts 24 can be determined.

The dynamic range of the incoming signals received at the base station 14 is important because it is difficult to design demodulators that can simultaneously demodulate a very weak signal while a very strong signal is also present. Also, the quality of service may be degraded by a user, having established a call with a weak signal, having his call inadvertently terminated by a second user with a stronger signal.

This problem can be partly, but not fully, counteracted by dynamic power control.

Since the coaxial interconnect losses from the handset 25 to the base station 14 are far less than the off-air propagation losses, the minimum signal strength received by the base station depends on the maximum distance of a user from one of the RF repeaters 24.

Figure 7:
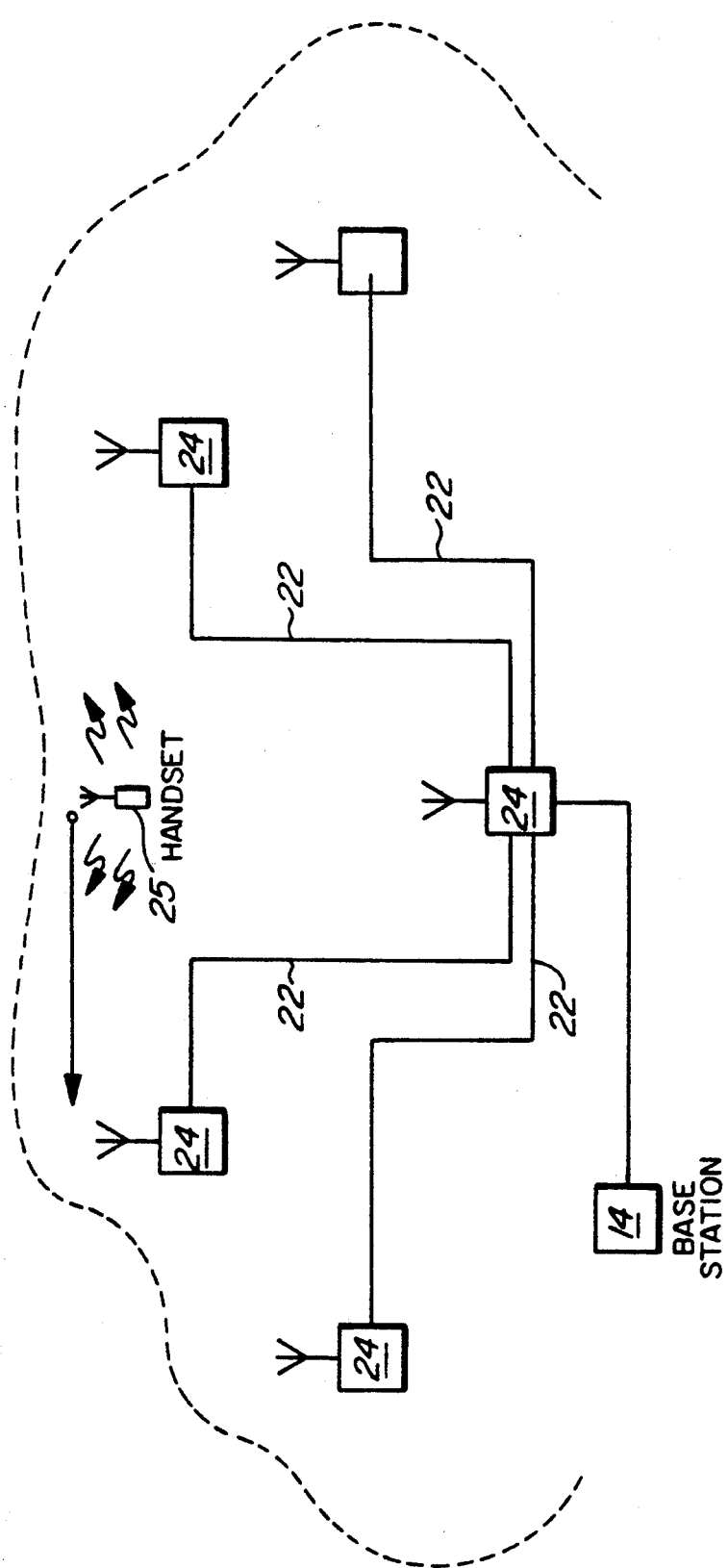
FIG. 7 shows a different distributed antenna arrangement.

It is therefore now proposed to distribute the RF repeaters parts 24 as illustrated in FIG. 7, in which each part 24 is shown spaced from at least one other of the repeaters 24 by a distance which is less than the diameter of the area of coverage of a cordless handset 25. In FIG. 7, the radius if this coverage has been indicated by $R_{max}$.

Figure 8A:
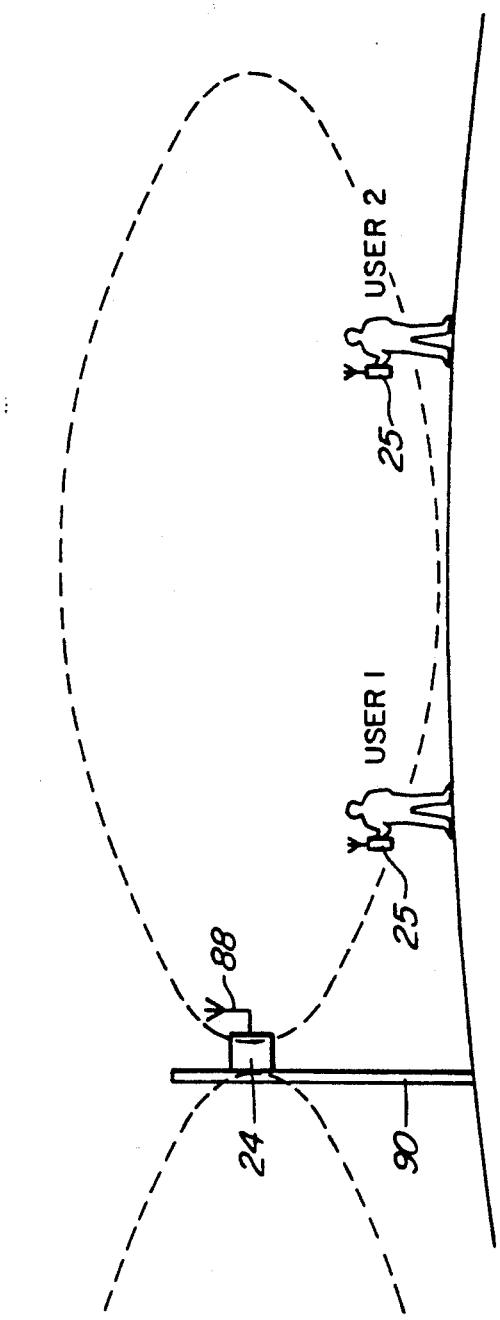
FIGS. 8A and 8B illustrate a wall mounted antenna arrangement.
Figure 8B:
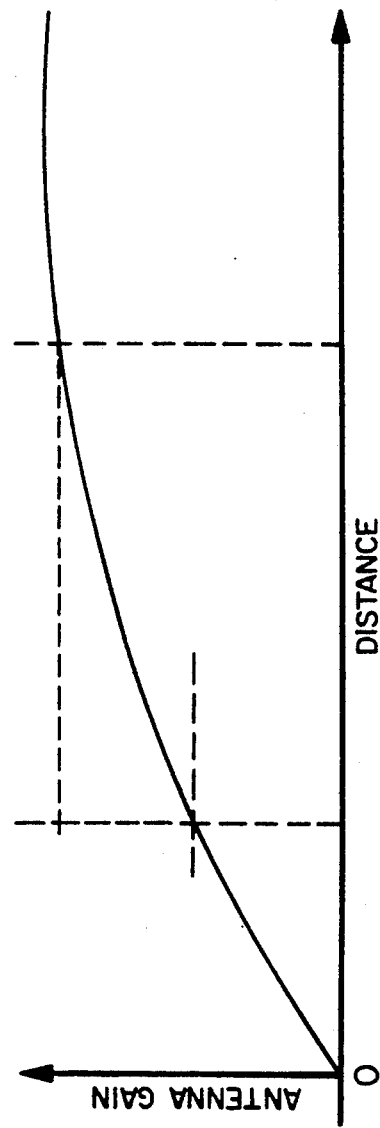

It is also possible to utilize the directional dipole properties of a simple dipole antenna. If such an antenna is mounted high then handsets are in effect "attenuated" by the lack of directional gain of the antenna, as illustrated in FIGS. 9A and 9B, in which the antenna is indicated by reference numeral 88 and is mounted on a wall 90. The graph of FIG. 8B represents the variation of the resultant antenna gain in relation to the distance of the user from the wall 90.

FIG. 9A shows the additional use of a physical barrier, represented by a shaded area 92, for preventing uses from approaching too closely to the antenna 88, and FIG. 9B shows a graph representing the variation of the maximum received signal strength with distance from this barrier. The barrier may for example take the form of a low loss wall, a fence or the like.

As will be apparent to those skilled in the art, various modifications of the present invention may be made within the scope of the invention as defined in the appended claims.

I claim:

1. An RF repeater arrangement for use in linking cordless handsets to a base station, comprising:
   a power supply unit connected to the base station;
   a plurality of RF repeaters for exchanging radio signals with the handsets;
   said RF repeaters being spaced from said power supply unit and being so distributed over an area to be serviced by said power supply unit that each of said RF repeaters is spaced from at least one other of said RF repeaters by a distance which is less than the range of coverage of the handsets;
   co-axial cable connecting said power supply unit to RF repeaters, said co-axial cable incorporating an inner conductor serving as a power conductor;
   said power supply unit comprising a DC power supply connected to supply DC power to said inner conductor; and
   means for connecting transmit signals from said base station to said co-axial cable and receive signals from said co-axial cable to said base station;
   said RF repeaters each comprising an antenna for exchanging the radio signals with the handsets, transmit circuit means for connecting the transmit signals from said co-axial cable to said antenna, receive circuit means for connecting receive signals from said antenna to said co-axial cable and a DC power pick-up connected to said inner conductor for powering the respective one of said RF repeaters.

2. An RF repeater arrangement as claimed in claim 1, further comprising a transmit/receive modulator at said power supply unit for supplying transmit/receive timing pulses through said co-axial cable to said RF repeaters; and means at each of said RF repeaters for controlling the supply of the power to said transmit circuit means and said receive circuit means in accordance with said transmit/receive timing pulses.

3. An RF repeater arrangement as claimed in claim 1, wherein a plurality of RF repeaters are connected in series by said co-axial cable.

4. An RF repeater as claimed in claim 1, wherein said RF repeaters each include means responsive to the transmit/receive timing pulses for providing an output, in response to each of the transmit/receive timing pulses, having a duration sufficient to exclude spurious pulses.

* * * * *